United States Patent [19]
Reed

[11] 3,854,360
[45] Dec. 17, 1974

[54] SELF-GAUGING MITRE SAW

[75] Inventor: James C. Reed, San Diego, Calif.

[73] Assignee: Manufacturing Approaches & Total Concepts, Inc., San Diego, Calif.

[22] Filed: Feb. 16, 1973

[21] Appl. No.: 333,383

[52] U.S. Cl.................... 83/468, 83/471.3, 83/522
[51] Int. Cl........................ B27b 27/10, B27b 5/20
[58] Field of Search ............ 83/468, 467, 466, 522, 83/452, 471, 471.3, 404.1, 581

[56] References Cited
UNITED STATES PATENTS

| | | | |
|---|---|---|---|
| 2,207,370 | 7/1940 | Bayley | 83/466 |
| 2,962,063 | 11/1960 | Gussler | 83/468 |
| 2,999,684 | 9/1961 | Kovalcik | 83/468 X |
| 3,298,097 | 1/1967 | Gilbert | 83/452 X |

*Primary Examiner*—Donald R. Schran
*Attorney, Agent, or Firm*—Cahill, Sutton & Thomas

[57] ABSTRACT

A self-gauging mitre saw is disclosed for cutting molding to fit the sides of a pattern piece. A hydraulically operated gauging plate is actuated to retain the pattern piece against a reference. Each of a pair of selectively utilized stops is mechanically associated with the gauging plate and travels therewith. The pair of stops travel within a channel, which channel is also adapted to receive the molding to be cut. A vertically selectively movable mitre saw assembly is disposed relative to the channel to intersect and cut the molding disposed therein as the mitre saw assembly descends. In operation, the pattern piece is secured against its reference by the gauging plate. Movement of the gauging plate will also cause each of the pair of stops to move toward the mitre saw assembly. The piece of molding to be cut to fit the pattern piece is inserted within the channel up to the actuated one of the pair of stops. In this position, the length of molding extending between the mitre saw assembly and one of the pair of stops is equal to the length of the pattern piece intermediate its reference and the gauge plate. The mitre saw assembly is actuated and caused to descend and cut the molding to the measured length.

5 Claims, 6 Drawing Figures

SELF-GAUGING MITRE SAW

The present invention relates to apparatus associated with mitre saws, and more particularly, to apparatus for semi-automatically measuring and cutting moldings to fit any given pattern piece.

In the art of cabinet making, it is quite common to make a multi-apertured cabinet front with the apertures defining various sized cabinets and/or drawwers. The cabinet doors and drawer fronts may be obtained from the cutouts, or they may be separately sized and cut to fit the apertures. To obviate the need for securing handles to the cabinet doors or drawers, it is common practice to attach molding about the periphery of the cabinet doors and drawer fronts. The molding, disposed about the periphery of the cabinet door or drawer front, extends beyond the plane defined by the overall cabinet front and thereby provides a convenient hand hold for opening the cabinet doors and drawer fronts. The molding also serves a second purpose in that in the closed position, the spacing intermediate the cabinet door or the drawer front and the overall cabinet front is hidden from view. Thus, a more aesthetically pleasing effect is obtained than if the cabinet doors or drawer fronts were flush with the overall cabinet front. There are also other benefits which may be achieved from the use of moldings. Among these are the following: the molding, if wood-grained, may be lightened or darkened with respect to the overall cabinet front to present a pleasing contract of wood grain; or, the molding may be colored differently from that of the cabinet doors or drawer fronts and the overall cabinet front to create a pleasing color scheme.

Many different types of apparatus are presently commercially available to make an apertured cabinet front. Some apparatus make apertures in a blank and employ the cutouts from the apertures as the cabinet doors or drawer fronts while others construct the cabinet front from a plurality of pieces and cut blanks to fit the various sized apertures.

The time tested craftsmanlike approach to cutting and fitting the moldings for the cabinet door or drawer fronts is that of measuring each of the sides of the blank; transferring the measurement to a strip of molding; cutting the molding at an angle of 45°; and, when the four moldings matching the four sides of the blank have been cut, securing them about the periphery of the blank. If the craftsman is diligent and conscientious, the moldings will fit precisely about the blank without gaps or misalignment. This method, although excellent in terms of the end product, is time consuming and completely out of place in a mass production cabinet making operation. The costs involved in such construction techniques are prohiibitive resulting in a non-competitively priced product.

To reduce the time consuming efforts of a skilled craftsman, some time saving apparatus have been developed. One of these is that of a rotary saw blade oriented to make a 45° cut and located a fixed distance from a reference point. The distance is equal to the length of the molding to be cut and is settable to duplicate the length of one side of a particular sized blank. Thus, the apparatus can be used to cut a plurality of specified length moldings. With this apparatus, a plurality of pre-cut moldings can be obtained for any particular sized cabinet door or drawer front. It is well known that it is almost impossible to have a plurality of identically sized blanks. Thus, the following difficulty is invariably encountered with this apparatus. Because the moldings extend about the periphery of the blank, any discrepancy in size, even though it be not much greater than one-sixteenth of an inch, will tend to cause the mitred joints to be off and allow gaps to form at the joint. One or more of the moldings will then be in a non-parallel relationship with the respective side and therefore misaligned. This misalignment, although slight, is almost immediately apparent to the eye because of the otherwise symmetrical nature of the overall cabinet front.

An improvement to the above-described apparatus has been that of employing two rotary saw blades set at an angle of 90° to one another. With this arrangement, a single cutting operation of the two-bladed saw apparatus cuts not only the molding to the desired length but cuts one end of the next molding to be cut at the desired angle. This improvement speeded up the molding cutting operation by eliminating one cutting operation. However, the improvement did not in any substantial manner increase the accuracy between each molding and its respective side of the blank.

It is therefore a primary object of the present invention to provide a self-gauging mitre saw for cutting moldings.

Another object of the present invention is to provide a self-gauging mitre saw for cutting various sized moldings.

Yet another object of the present invention is to provide a mitre saw for cutting moldings to fit any sized pattern piece.

Still another object of the present invention is to provide a mitre saw employing the pattern piece for gauging the length of molding to be cut.

A further object of the present invention is to provide a self-gauging dual cut mitre saw for cutting moldings.

A yet further object of the present invention is to provide a pneumatic control system for a self-gauging mitre saw.

A still further object of the present invention is to provide a control system for a self-gauging mitre saw employing a plurality of interlocks and safety features.

These and other objects of the present invention will become apparent to those skilled in the art as the description thereof proceeds.

The present invention may be understood with greater specificity and clarity with reference to the following drawings, in which.

Figure 1:
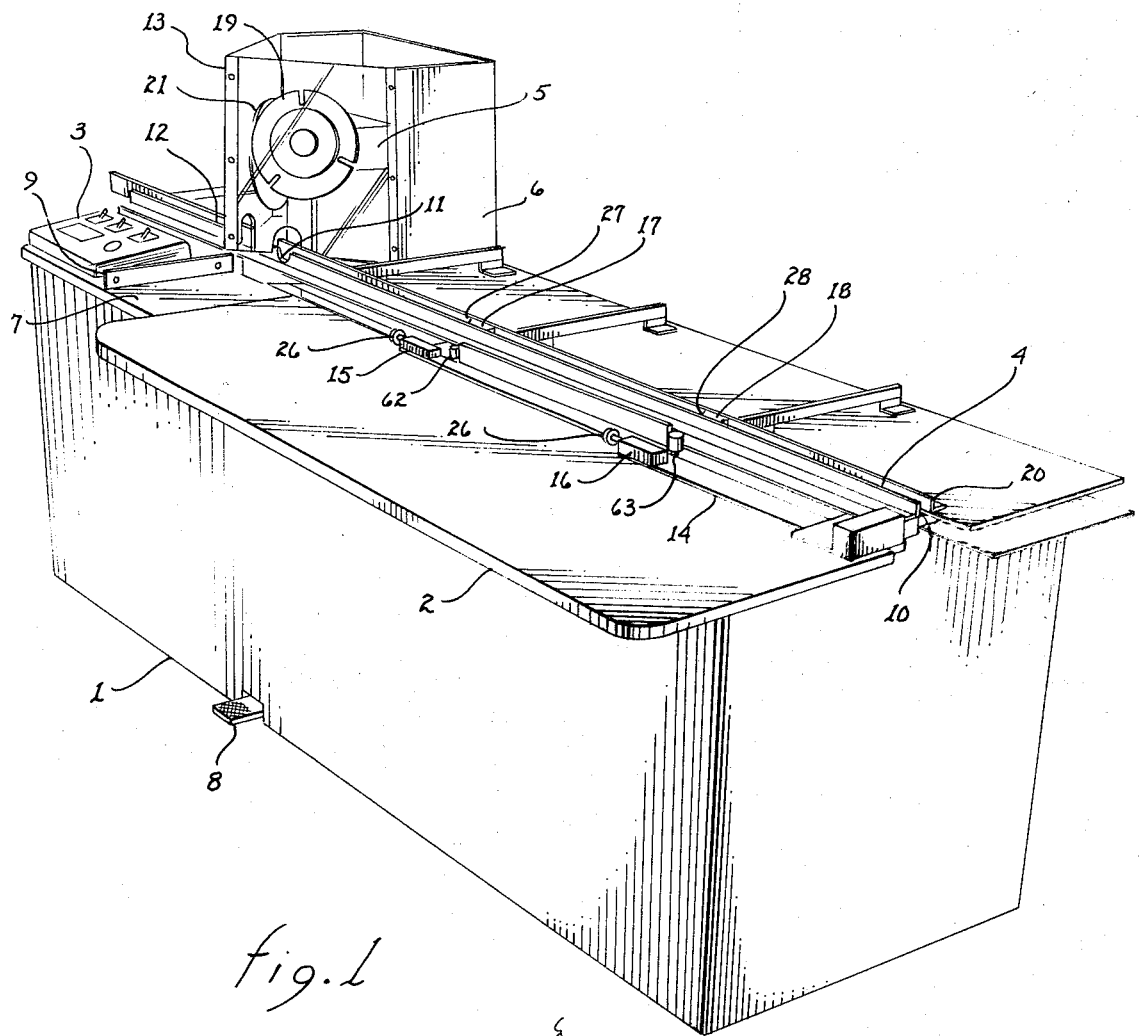
FIG. 1 illustrates the environment of the present invention.

Referring to FIG. 1, there is shown a cabinet 1, which cabinet encloses a substantial part of the operative mechanisms and supports the work table 2 of the present invention. A control panel 3 is located adjacent the operator's position, which position is generally identified by numeral 7. A mitre saw assembly 5 is positioned at the far side of work table 2 and approximately opposite to the operator's position 7. The assembly 5 is surrounded by a transparent shield 6, which shield protects the operator from blowing sawdust and flying particles. Beneath the operator's position 7, there is positioned a foot pedal 8. To the left of the operator's position 7 and slightly left of the intersection of the two mitre saws of mitre saw assembly 5, there is located a reference or stop 9. A channel 4 is disposed along the approximate center of work table 2 for receiving a length of molding 23. The vertically extending member 10 of channel 4, includes a pair of thumb notches 11 and 12. One of these thumb notches is positioned at either side of apex 13 of shield 6. A gauge plate 14, operably associated with channel 4, is used to control and limit the length of the piece of molding 23 to be cut.

Figure 2:
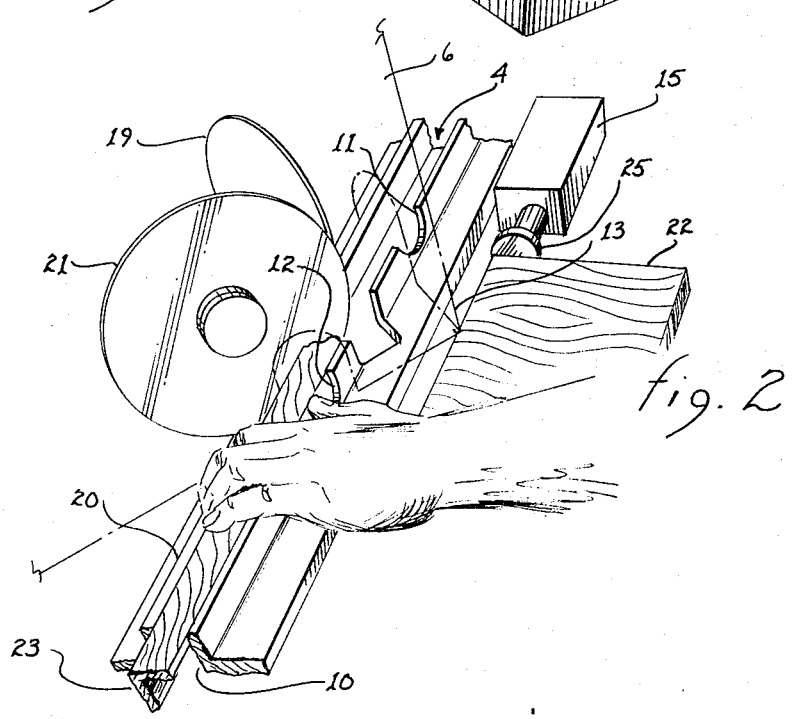
FIG. 2 illustrates a perspective view of the cutting operation of the present invention.
Figure 3:
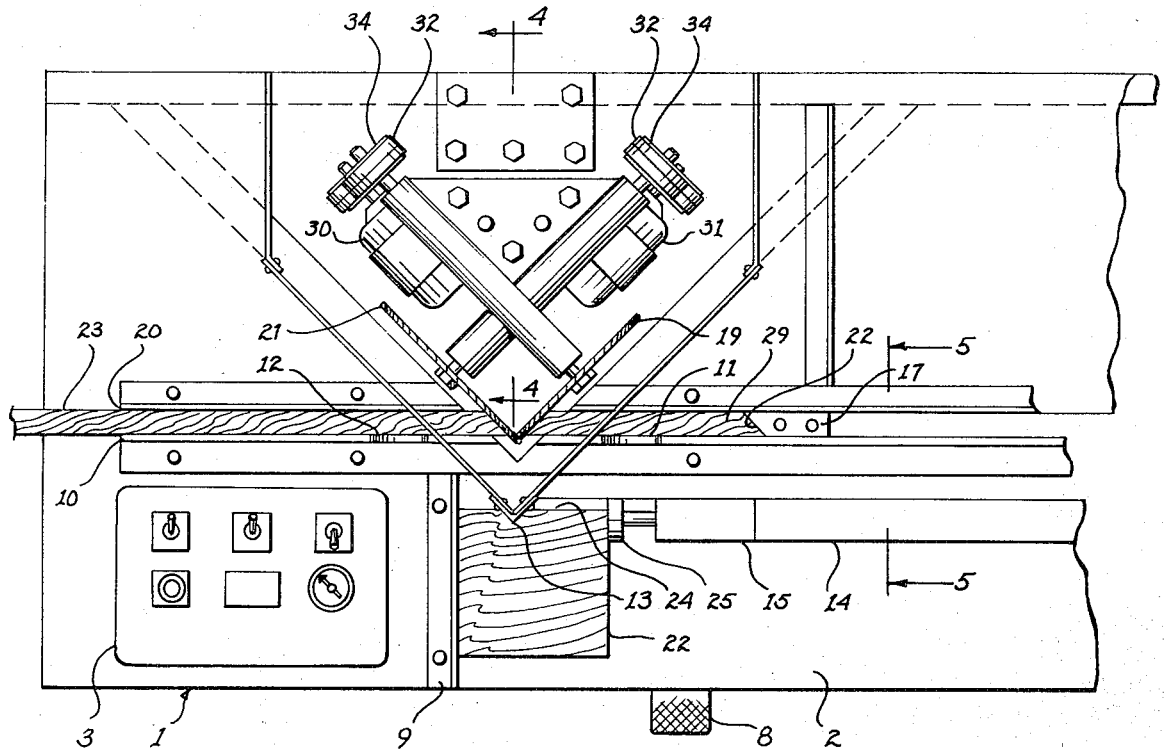
FIG. 3 illustrates a top view of the cutting operation of the present invention.

Before proceeding to a more detailed description of the present invention, the suimmary of the overall operation of the present invention will be presented with reference to FIGS. 2 and 3 to provide a better understanding of the operative importance of each of the elements embodied in the present invention. A control panel 3 includes gauges for measuring the air pressures at critical points. It also includes switches to actuate either of stops 17 or 18 and gauge plate 14 and override switches for the operation of foot pedal 8 and the attendant movement of the mitre saw assembly 5. A pattern piece 22, such as a cabinet door blank, or drawer front blank is positioned upon work table 2 adjacent stop 9. The length of the molding 23 to be cut is determined by the distance from stop 9 toward the right-hand side of the work table along side 24 of pattern piece 22. The length is set by actuating one of the controls on control panel 3 which control actuates a hydraulic cylinder. The hydraulic cylinder moves the gauge plate 14 toward the pattern piece 22 until either gauge 15 or gauge 16 contacts the pattern piece. One of the stops 17 or 18, associated with one of gauges 15 or 16, respectively, is raised within channel 4 to block the passage of the molding inserted from the left-hand side of the channel. At this point, it will be assumed that the end of the molding contacting one of the stops had been previously cut at an angle of 45°. The dimensional relationship between stop 9 and the engaged gauge 15 or 16 is configured to be mechanically equivalent to the dimensional relationship between the engaged stop 17 or 18 and blade 19 of the mitre saw assembly 5. The molding is lodged in place within channel 4 by the operator, whose thumbs may be positioned within thumb notches 11 and 12 to brace the molding against upright member 20 of channel 4. The width and depth of channel 4 is purposely made large so as to permit various sized and configured moldings to be inserted therein. When the molding 23 has been securely positioned against member 20 by the hands of the operator, the molding is ready to be cut. To actuate the mitre saw assembly 5 and to lower it, the operator depresses foot pedal 8. Actuation of foot pedal 8 will lower the mitre saw assembly 5 and the spinning blades 19 and 21. As the blades lower, they will come in contact with the molding within channel 4 and cut the molding. After cutting, the mitre saw assembly will automatically raise itself to be in position for a subsequent cut.

From the brief description above, it will be apparent to those skilled in the art that the present invention may be used to cut individuall sized moldings for any sized pattern piece. As there may be some discrepancies in some of a plurality of supposedly identically sized pattern pieces, the present invention will accommodate any such discrepancies to insure that the moldings are an exact fit for each pattern piece.

With joint reference to FIGS. 2 and 3, the apparatus attendant the cutting operation of the molding will be explained in further detail. In initiating the cutting operation, the pattern piece 22, which pattern piece may be a cabinet door or a drawer front, is lodged adjacent stop 9. At this point, the operator must determine whether or not the pattern piece 22 should be measured by either gauge 15 or 16. Gauge 15 is to be used if the pattern piece is less than 36 inches in length, while gauge 16 is to be used if the pattern piece is greater than 36 inches. Once this determination is made, stop 17 is raised if gauge 15 is to be used by energizing an air cylinder through one of the switches on control panel 3. If gauge 16 is to be used, stop 17 is not raised. Stop 18 is permanently fixed in a raised position.

The molding 23 to be cut to fit the side 24 of pattern piece 22 facing the mitre saw assembly 5 is inserted into channel 4 from the left side of cabinet 1. The molding 23 is inserted until the end thereof contacts the raised stop, stop 17 as shown in FIG. 3. As previously discussed, the spacing between stop 17 and blade 19 is equivalent to the spacing between gauge 15 and stop 9. To insure perfect accuracy, each of the gauges 15 and 16 includes an adjustable extension 25 and 26, respectively. Although the adjustable extensions may take any one of several forms, a form found particularly useful is that of threadedly engaging the respective extension with the gauge itself. Thus, the respective extension can be threaded into or out of the gauge to insure that the spacing defined between the extension used and stop 9 is, in fact, equivalent to the spacing between the respective stop 17 or 18 and blade 19. For special aesthetic effects, the molding may be purposely cut oversize or undersize by threading either of adjustable extensions 25 and 26 for an additional distance into or out of the respective gauges.

Stops 17 and 18 each include an angled face 27 and 28, respectively, which face matches the angle at the end of molding 23. As two adjacent moldings, when assembled, define a right angle, the end cut of molding 23 is at a 45° angle. For the same reason, the blades 19 and 21 together define a 90° angle with the blades making opposed 45° cuts in the molding.

Once the molding 23 has been positioned as described above, a piece of molding conforming in length to the length of side 24 of pattern piece 22 may be cut. When the operator is ready to cut the molding 23, he grasps member 20 of channel 4, molding 23 and member 10 of chaannel 4 with his fingers. In addition, he may wish to insert his thumbs through thumb notches 11 and 12 to force the rear of the molding 23 adjacent member 20. In this manner, the molding can be firmly oriented and lodged within channel 4 and it will not be disturbed by the cutting operation of the saw blades 19 and 21. To initiate the cutting operation, the operator depresses foot pedal 8. This causes the mitre saw assembly 5 to move downwardly. Blades 19 and 21, previously energized by energizing their respective electric motors and drive systems, descend and cut molding 23. When the mitre saw assembly 5 reaches its set low point, the assembly will automatically be raised. The molding has now been cut in two places.

The first cut of the molding, made by blade 19, has cut a molding piece 29 corresponding in length to side 24 of pattern piece 22. The previously discussed gauging mechanisms ensure that the cut molding is of the exact length desired. A second cut made by blade 21 cuts the end of the remaining piece of molding 23 at an angle of 45°, which cut will match the face 27 of stop 17 as required for a subsequent molding cut. The cut molding piece 29 may then be removed by the operator. The short length of molding intermediate the two cuts drop through table 2 to a collection bin disposed therebeneath.

To cut the remaining three moldings for the remaining three sides of pattern piece 22, the above gauging and cutting operation is repeated for each of the remaining sides. That is, one of the controls of control panel 3 is actuated to de-energize gauge plate 14, causing the latter to travel to the right and disengage pattern piece 22. The pattern piece 22 is then repositioned. The previously mentioned switch on control panel 3 is switched to reactivate the air cylinder controlling the motion of gauge plate 14, whereby the gauge plate 14 is brought against pattern piece 22 to secure the latter against stop 9. The molding 23 is further inserted within channel 4 until the newly cut end of the molding is adjacent stop 17, the latter being repositioned by the new position of gauge 15. The foot pedal 8 is depressed, causing the mitre saw assembly 5 to make yet another cut through molding 23. This process may be repeated ad infinitum.

Where the pattern pieces are in fact of exactly the same size or where a plurality of single sized molding lengths are to be cut, the gauge plate 14 may be continuously held against the pattern piece 22. The molding 23, inserted within channel 4, is then cut to the desired number of lengths by depressing foot pedal 8, cutting the molding, removing the cut length, further inserting the molding, depressing the foot pedal, etc.

Figure 4:
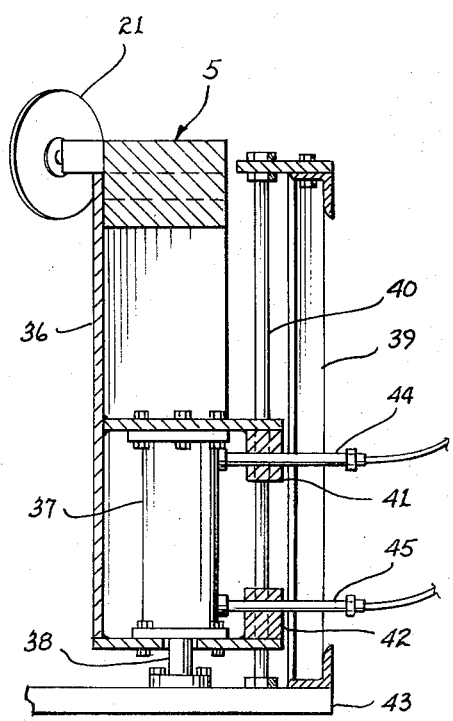
FIG. 4 illustrates a side view of the mitre saw assembly positioning apparatus.

In FIG. 4, there is shown one embodiment for lowering and raising the mitre saw assembly 5. Each of the blades 19 and 20 is energized through its own electric motor 29 and 30, respectively. A system of pulleys 33 and 34 and belts 31 and 32 transmit the rotary motion imparted by the motors to their respective saw blades. The above-described assembly is firmly mounted upon a pedestal 36. The pedestal 36 is secured to base 43 of cabinet 1 through a post assembly 39. The relationship between pedestal 36 and post assembly 39 may be of any one of several mechanical arrangements, which arrangements permit one element to move longitudinally with respect to the other with a minimum amount of slop. The arrangement shown in FIG. 4 is a simple arrangement which includes one or more runners 40 firmly secured to post assembly 39 and base 43. A plurality of slides, such as slides 41 and 42 securely mounted on pedestal 36 engage runner 43.

The vertical movement of pedestal 36, and hence mitre saw assembly 5, is effected through a vertically oriented air cylinder 37. The plunger 38 of air cylinder 37 is secured to base 43. In operation, air pressure introduced into the cylinder 37 through air inlet 44 will create an air pressure within the cylinder forcing the plunger 38 to extend. As the plunger cannot be physically moved, the cylinder 37 will instead move upwardly. The upward movement of cylinder 37, the latter being tied to pedestal 36, causes pedestal 36 to move upwardly. A second air inlet 45, when connected to an air pressure source, will create an air pressure within the cylinder forcing the plunger 38 to retract. As plunger 38 cannot retract, cylinder 37 moves downwardly and thereby brings about the same end result.

Figure 5:
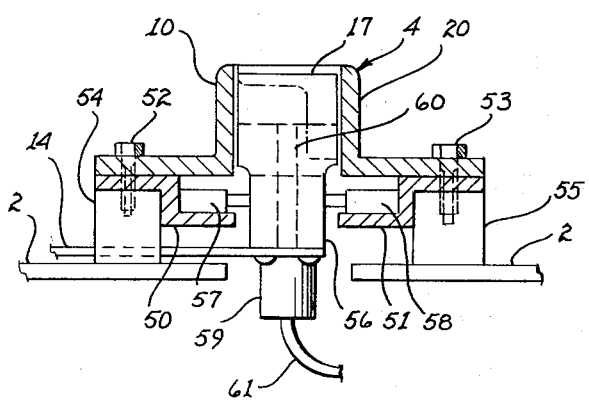
FIG. 5 illustrates a cross section of the molding retaining channel taken along lines 5—5 as shown in FIG. 3.

Referring to FIG. 5, there is shown a cross section of channel 4 and the gauge plate 14 in combination with its respective guiding elements. Each of the base members 54 and 55 are firmly secured to the work table 2 as shown. Members 10 and 20 of channel 4 are mounted on one of base member 54 and 55, respectively. Member 10 may be selectively adjusted in the lateral direction to accommodate various sized moldings. Intermediate member 10 and base member 54 there is disposed a channel iron 50. Channel iron 50, when juxtaposed with the base of member 10, forms a cavity therebetween. Similarly, intermediate member 20 and base member 55, there is disposed a second channel iron 51. The channel iron 51, when juxtaposed with member 20, forms another cavity therebetween. The previously discussed gauge plate 14 is fixedly secured to a support 56, which support is disposed parallel to and beneath channel 4. Support 56 is guided and supported by a plurality of rollers, such as rollers 57 and 58, as shown. These rollers fit within the respective cavities defined by member 10 and channel iron 50 and member 20 and channel iron 51. Referring momentarily to FIG. 1, guides, such as rollers 62 and 63, cooperate with support 56 to prevent lateral movement thereof. Thus, gauge plate 14 is movably supported above the surface of work table 2. The stops 17 and 18, of which stop 17 is shown, are secured to support 56. An air cylinder 59 is secured to support 56 and disposed beneath stop 17. Stop 17 is rigidly secured to plunger 60 extending through support 56 from cylinder 59. An air hose 61 conveys pressurized air to cylinder 59. In summary, gauge plate 14 and stops 17 and 18, each being associated with support 56, are supported by rollers 57 and 58 with a freedom of movement in the longitudinal axis and rollers 62 and 63 prevent movement in the lateral axis.

Figure 6:
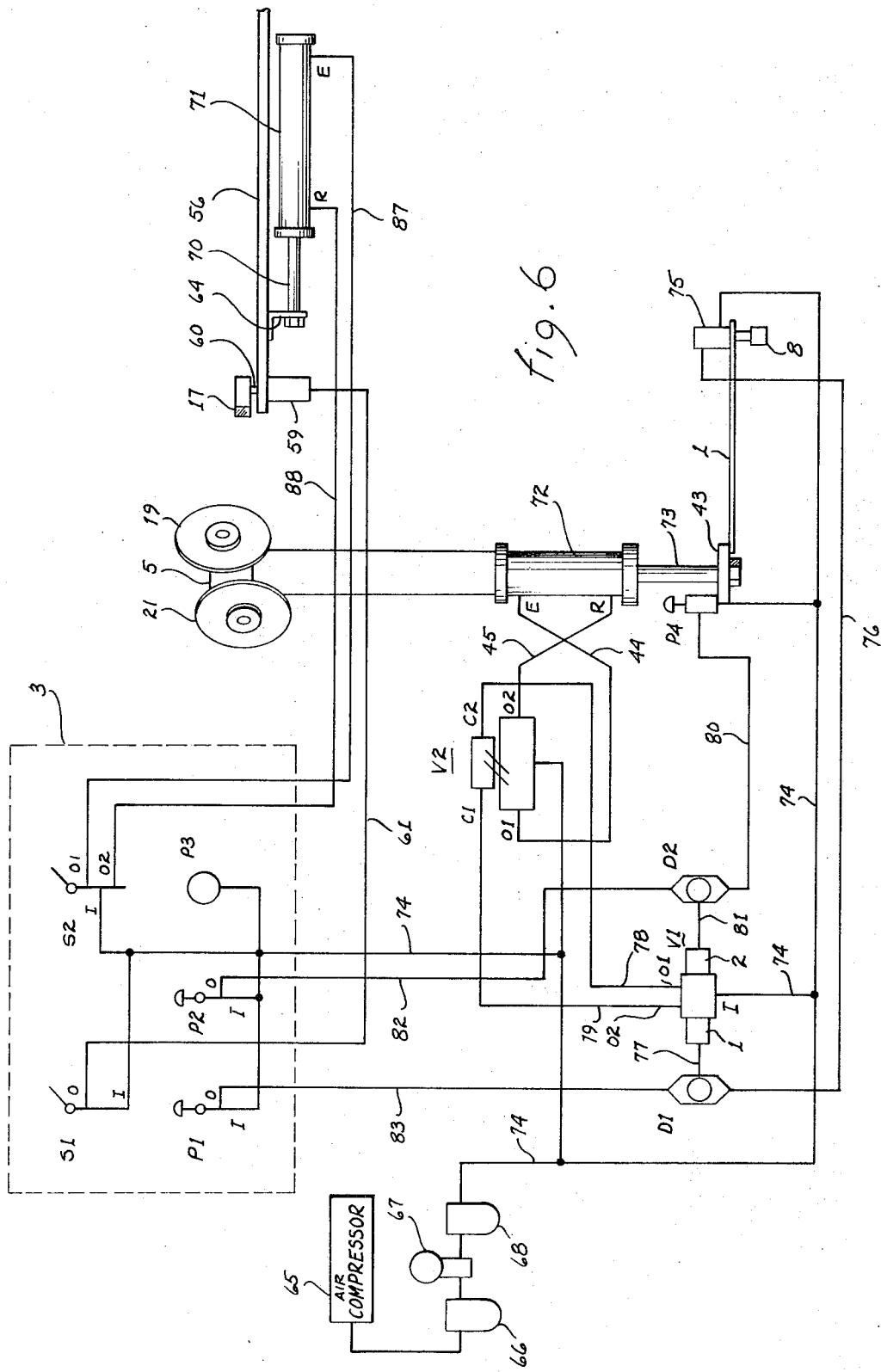
FIG. 6 is a schematic of the pneumatic control system of the present invention.

The control system of the present invention will be described with respect to FIG. 6. An air compressor 65 provides a source for compressed air. The compressed air is conveyed through a filtration system 66, a regulator 67 and a lubricator 68. These elements are optional, but should be used in order to have the present invention operated to its fullest advantage. The filter is particularly necessary as it is anticipated that the present invention will be used within carpentry shops where the air is generally filled with fine sawdust and other minute airborne debris. The regulator 67 is advisable in order to provide the to-be-described valves and air cylinders with controlled air pressure so as to obtain a controlled rate of operation and not cause damage to the components themselves. The lubricator 68 is necessary to inject a lubricant into the air stream, which lubricant continually lubricates and maintains the seals within the various valves. Thus, line 74, extending from lubricator 68, supplies filtered, regulated and lubricated air to the inputs (I) of switches and valves S-1, S-2, P-1, P-2, P-4, 8, V-1 and V-2.

To initiate the previously described operation of the present invention, toggle switch S-1 is switched from a first state to a second state. In the second state, the air input I to switch S-1 is conveyed to the output O and air will flow through the attached line 61. Line 61 is connected to air cylinder 59. The plunger 60 of air cylinder 59 is attached to stop 17. Thus, by introducing an air flow within line 61, the plunger 60 will be forced out of air cylinder 59, causing stop 17 to extend upwardly. It has been, of course, assumed that a pattern piece less than 36 inches in length is being used. If the pattern piece is more than 36 inches in length, the stop 18 is utilized. Stop 18, also limiting the maximum length of molding that may be cut, is permanently affixed at the upward position. Therefore, if a pattern piece greater than 36 inches in length is to be cut, switch S-1 is not switched to its second state and stop 17 will remain in the retracted position so as not to impede insertion of the molding within channel 4.

After the pattern piece 22 (see FIG. 3) is positioned adjacent stop 9, gauge plate 14 is energized to determine the length of side 24 of the pattern piece 22. Toggle switch S-2, when in a first state, allows a flow of air from the input I through output O-1 to the rear input E (extend) of air cylinder 71 through line 87. A flow of air through the input E causes the plunger 70 within air cylinder 71 to extend. Plunger 70 is connected to support 56 (see FIG. 5) through a bracket 69. Thus, the extending plunger 70 moving support 56 also moves gauge plate 14, the associated gauge 15 and stop 17 toward pattern piece 22. On contact between the pattern piece 22 and extension 25 of gauge 15, the plunger 70 is restrained from further movement. The air pressure acting upon the piston of plunger 70 internal to air cylinder 71 will maintain gauge 15 firmly positioned against the pattern piece. The molding 23 is now inserted within channel 4 as described above and held in place by the operator.

To cut the molding to a length 29 conforming with side 24 of the pattern piece 22, the operator depresses foot pedal 8. The depressed foot pedal 8 opens the associated valve 75 so that the air pressure within line 74 is conveyed through the valve and through line 76 to directional valve D-1. The inflowing air to D-1 from line 76 flows out through line 77 to input 1 of valve V-1. Input 1 of valve V-1 is termed in the art as an AR, that is actuator reset. In operation, it functions as follows. An input control signal to input 1 momentarily opens a channel between the input I to valve V-1 from line 74 to output O-1 connected to line 78. After a momentary air flow through outlet O-1, outlet O-1 is closed off even though there may be a continuing input signal from line 77 to input 1. The momentary air flow within line 78 is conveyed to control input C-2 of valve V-2. A control signal at C-2 of valve V-2 opens the passageway between line 74 connected to the input I and output O-2 connected to line 45. Line 45 is connected to plunger retract input R of air cylinder 72. As previously discussed, air cylinder 72 is utilized to raise and lower the mitre saw assembly 5. An air pressure input through input R causes a pressure buildup to occur between the piston of plunger 73 and the base of air cylinder 72. This air pressure will in turn tend to cause plunger 73 to retract within air cylinder 72. As plunger 73 is connected to base 43 of cabinet 1, the plunger 73 will remain stationary while air cylinder 72 will move downwardly. Thus, the mitre saw assembly 5 connected to air cylinder 72 will also move downwardly.

As the mitre saw assembly 5 moves downwardly, it will, in due course, cause blades 19 and 20 (which have been previously actuated) to contact and cut the molding 23 disposed within channel 4. Further downward movement of air cylinder 72 causes the base of the air cylinder to depress push button switch P-4. By depressing switch P-4, the air input from line 74 is conveyed through switch P-4 and into line 80. Line 80 conveys the flow of air to directional valve D-2 and out therefrom to line 81. Line 81 provides a control ilput to input 2 of valve V-1. An air pressure present at input 2 of valve V-1 will cause the air flow from line 74 to valve V-1 to be channeled through output O-2 and into line 79. Line 79 is connected to control input C-1 of valve V-2. An air flow input at input C-1 opens the passageway between line 74 connected to the input I of valve V-2 through output O-1 connected to line 44. Line 44 connects output O-1 to input E (extend) of air cylinder 72. An air flow through input E of air cylinder 72 causes a pressure buildup to occur between the piston of plunger 73 and the top of air cylinder 72. The increase in air pressure above the piston of plunger 72 will tend to cause the plunger 73 to extend from cylinder 72. As previously discussed, plunger 73 is rigidly secured to base 43. Thus, an air pressure input through input E will tend to raise air cylinder 72 and the connected mitre saw assembly 5 will also be raised. The continuing air pressure input through input E of air cylinder 72 will tend to cause the mitre saw assembly 5 to remain in the raised position until an opposite command is initiated.

After the molding piece 29 has been cut, pattern piece 22 may be removed. To release the pattern piece 22 from gauge plate 14, switch S-2 is switched from its second state to its first state. In the first state, the air input to switch S-2 from input I flows through output O-2 to the front input R (retract) of air cylinder 71 through line 88. A flow of air through input R causes plunger 70 within air cylinder 71 to retract. As plunger 70 retracts, the attached gauge plate 14 and gauge 15 will also retract and release pattern piece 22.

Control panel 3 also includes two push button switches P-1 and P-2 for raising and lowering the mitre saw assembly 5 by manually actuating air cylinder 72. When push button switch P-1 is depressed, the air pressure input from line 74 is conveyed through the output O to line 83. Line 83 conveys a flow of air to directional valve D-1, therethrough and into line 77. As discussed above, an input to input 1 of valve V-1 will convey a control input to C-2 of valve V-2, causing an air flow through output O-2 into line 45. An air flow through line 45 and into input R of air cylinder 72 will lower the mitre saw assembly 5. As the air cylinder 72 continues to descend, it will in due course depress push button switch P-4. And, as previously discussed, depressing push button switch P-4 will produce an air flow into input E of air cylinder 72 causing the air cylinder 72 and attached mitre saw assembly 5 to rise.

Manual push button switch P-2 acts in the nature of an emergency switch. Depressing the switch P-2 permits an air flow from line 74 to flow through line 82 into output O-2 of valve V-1, by way of directional valve D-2, into line 79. And, as previously discussed, an input to input 2 of valve V-1 will provide an input to input C-1 of valve V-2, which in turn provides an output through output O-1 of valve V-2 into line 44. Line 44, being connected to input E of air cylinder 72 will cause air cylinder 72 and the attached mitre saw assembly 5 to rise. Because of the reset feature of input 1 of valve V-1, an input to input 2 of valve V-1 will override a previously provided command through foot pedal 8 or push button switch P-1.

An emergency push button switch P-3 is also disposed within control panel 3. In case of mistake, danger or injury, switch P-3 is depressed. By depressing switch P-3, the air pressure within line 74 is vented to the atmosphere and all hydraulic functions dependent upon an air pressure source will cease operating.

No specific switches are shown for actuating the electric motors 29 and 30 associated with saw blades 19 and 21. However, it is deemed to be within the capability of one skilled in the art to hook up either a separate electrical switch for the motors or to tie such an electrical switch to the operation of one or more of the switches disposed within control panel 3 and described above.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A self-gauging mitre saw apparatus mounted upon a work table for cutting molding to a length equivalent to the distance between opposing first and second sides of a pattern piece, said apparatus comprising in combination:
   a. a channel secured to the work table for receiving a length of molding;
   b. a vertically movable dual cut mitre saw assembly having a pair of cutting blades set at an angle of 90° with respect to one another, said cutting blades being at angles of 45° and 135°, respectively, with respect to said channel, said saw assembly being selectively movable in the vertical axis to intersect said channel;
   c. an upwardly extending reference point fixedly attached to the work table in proximity to said saw assembly for defining the position of the first side of the pattern piece;
   d. a slideable gauge plate having a gauge extending lateral therefrom, said gauge plate being slideable parallel to said channel to position said gauge adjacent the second side of the pattern piece; and
   e. a stop disposed within said channel for limiting the length of molding to be cut by said saw assembly, said stop being secured to said gauge plate and slideable therewith within said channel; whereby, the gauge plate automatically determines the length of molding to be cut to conform with the distance between the first and second sides of the pattern piece.

2. The apparatus as set forth in claim 1 wherein:
   a. said gauge plate includes two gauges, a first gauge for pattern pieces of up to a first length and a second gauge for pattern pieces of a length greater than said first length;
   b. said stop including a first stop associated with said first gauge and a second stop associated with said second gauge; and, c. said first stop including means for raising and lowering said first stop within said channel; whereby, said first stop is raised to prevent the molding from sliding therepast and lowered to allow the molding to slide therepast to contact said second stop.

3. The apoparatus as set forth in claim 1 wherein the face of said stop in contact with the molding inserted within said channel is at an angle of 45° with respect to said channel.

4. The apparatus as set forth in claim 2 wherein each of said gauges includes threaded adjustment means for matching the distance between the blades of said saw assembly and said first and second stops to the distance between said reference point and said first and second gauges, respectively.

5. The apparatus as set forth in claim 4 wherein said channel includes a pair of thumb notches disposed in proximity to said mitre saw assembly for providing access to the molding to aid in positioning the molding adjacent one side of said channel.

* * * * *